(12) United States Patent  
Kadiri et al.

(10) Patent No.: US 11,432,260 B2
(45) Date of Patent: Aug. 30, 2022

(54) UNIFIED ACCESS CONTROL PARAMETER UPDATE

(71) Applicant: QUALCOMM Incorporated, San Diego, CA (US)

(72) Inventors: Prasad Reddy Kadiri, San Diego, CA (US); Umesh Phuyal, San Diego, CA (US); Mungal Singh Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/911,997

(22) Filed: Jun. 25, 2020

(65) Prior Publication Data

US 2021/0022107 A1  Jan. 21, 2021

Related U.S. Application Data

(60) Provisional application No. 62/874,377, filed on Jul. 15, 2019.

(51) Int. Cl.
*H04W 68/00* (2009.01)
*H04W 76/20* (2018.01)
(Continued)

(52) U.S. Cl.
CPC ......... *H04W 68/005* (2013.01); *H04W 48/08* (2013.01); *H04W 72/12* (2013.01);
(Continued)

(58) Field of Classification Search
CPC ... H04W 68/005; H04W 76/20; H04W 48/08; H04W 72/12; H04W 84/18; H04W 48/16;
(Continued)

(56) References Cited

U.S. PATENT DOCUMENTS

2012/0282965 A1  11/2012  Kim et al.
2014/0086173 A1*  3/2014  Sadeghi ................. H04L 5/003
                                                                 370/328

(Continued)

FOREIGN PATENT DOCUMENTS

WO  2019013597 A1  1/2019
WO  2019136634 A1  7/2019

OTHER PUBLICATIONS

International Search Report and Written Opinion—PCT/US2020/039832—ISA/EPO—dated Oct. 9, 2020.

*Primary Examiner* — Mazda Sabouri
(74) *Attorney, Agent, or Firm* — Harrity & Harrity, LLP; Nerrie M. Zohn

(57) ABSTRACT

Techniques and apparatuses described herein provide for an indication that a unified access control (UAC) parameter of a user equipment (UE) has changed. For example, a paging message or direct indication information may be provided to a UE indicating that a UAC parameter has changed. In such a case, the UE may not be expected to periodically check a scheduling information list of a system information block type 1 (SIB1). Thus, battery power of UEs may be conserved and signaling resources that would otherwise be used to periodically check the scheduling information list may be conserved.

48 Claims, 9 Drawing Sheets

(51) Int. Cl.
    *H04W 48/08*     (2009.01)
    *H04W 72/12*     (2009.01)
    *G16Y 10/75*     (2020.01)
    *H04W 84/18*     (2009.01)

(52) U.S. Cl.
    CPC ............ *H04W 76/20* (2018.02); *G16Y 10/75* (2020.01); *H04W 84/18* (2013.01)

(58) Field of Classification Search
    CPC ..... H04W 68/00; H04W 48/06; H04W 48/12; G16Y 10/75
    See application file for complete search history.

(56) References Cited

U.S. PATENT DOCUMENTS

| | | | |
|---|---|---|---|
| 2018/0270738 A1 | 9/2018 | Martinez Tarradell et al. | |
| 2019/0215858 A1 | 7/2019 | Ishii | |
| 2020/0052963 A1* | 2/2020 | Kim | H04L 41/0806 |
| 2020/0275344 A1 | 8/2020 | Byun et al. | |
| 2020/0344670 A1* | 10/2020 | Li | H04W 48/08 |
| 2020/0389835 A1* | 12/2020 | Talebi Fard | H04W 12/76 |
| 2021/0076303 A1* | 3/2021 | Liang | H04W 48/02 |
| 2021/0377848 A1* | 12/2021 | Wu | H04W 48/12 |

* cited by examiner

UNIFIED ACCESS CONTROL PARAMETER UPDATE

CROSS-REFERENCE TO RELATED APPLICATION

This patent application claims priority to U.S. Provisional Patent Application No. 62/874,377, filed on Jul. 15, 2019, entitled "UNIFIED ACCESS CONTROL PARAMETER UPDATE," and assigned to the assignee hereof. The disclosure of the prior application is considered part of and is incorporated by reference into this patent application.

BACKGROUND

Field

Aspects of the present disclosure generally relate to wireless communication and to techniques and apparatuses for a unified access control (UAC) parameter update.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

Unified access control (UAC) may provide a mechanism for access barring of UEs, such as in an LTE access network associated with a 5G core network. For example, UAC may provide for UEs associated with a certain access identity to be barred from accessing a network. This may be useful in high-congestion scenarios to ensure that more important, higher priority UEs can access the network. The next generation radio access network (NG-RAN) may broadcast access barring control information associated with access categories and access identities (in the case of network sharing, the barring control information can be set individually for each public land mobile network (PLMN)). A UE may determine whether an access attempt is allowed or barred based at least in part on the barring information broadcast for a selected PLMN, and the selected access category and access identity for the access attempt For example, for non-access stratum (NAS) triggered requests, an NAS layer may determine the access category and access identity, and for access stratum (AS) triggered requests, a radio resource control (RRC) layer of the UE may determine the access category, and the NAS layer may determine the access identity. The access category and access identity may be referred to as UAC parameters.

In some cases, a BS may provide UAC parameters using a broadcast control channel (BCCH) such as a system information block (SIB). A SIB identifying a UAC parameter may be referred to herein as a UAC SIB. One example of a UAC SIB is system information block type 25 bandwidth reduced (SIB25-BR). For example, the BS may transmit a system information block type 1 (SIB1), which may include an indication (e.g., a system information value tag and/or the like) of whether a UAC SIB will be transmitted by the BS. The UE may periodically check SIB1 to determine whether the indication is present. If the transmission of the UAC SIB is indicated by SIB1, the UE may attempt to acquire the UAC SIB (e.g., whether the UE is in idle mode, inactive mode, or connected mode). A UAC SIB may be optional for the BS to broadcast. If the presence of the UAC SIB is not indicated by SIB1, the UE may not attempt acquisition of the UAC SIB and may assume that access by the UE is not barred. This process of UAC parameter acquisition via the UAC SIB based at least in part on an indication in SIB1 may be applicable for low-power UEs, such as cellular IoT (cIoT) UEs. However, cIoT UEs are power-sensitive, and periodically acquiring a UAC SIB based at least in part on a BCCH modification period and a SIB1-indicated system information value tag may use significant power of a cIoT UE.

Techniques and apparatuses described herein provide for indication that a UAC parameter has changed. For example, a paging message or direct indication information may be provided to a UE, such as a cIoT UE, indicating that a UAC parameter has changed. When the UE receives an indication that the UAC parameter has changed, the UE may acquire SIB1 prior to a next modification boundary (e.g., without waiting for the next modification boundary), and may reacquire a UAC SIB if the UAC SIB is identified by the SIB1. In such a case, the UE may not be expected to periodically check SIB1's scheduling information list. Thus, battery power of cIoT UEs may be conserved and signaling resources that would otherwise be used to periodically check SIB1's scheduling information list may be conserved. Furthermore, UAC for cIoT UEs may be more efficiently managed, thereby improving usability of UAC and enabling access control in cIoT deployments without undue diminution of the battery life of a cIoT UE.

In an aspect of the disclosure, a method, a cellular Internet of Things user equipment (cIoT UE), a base station, an apparatus, and a computer program product are provided.

In some aspects, a method of wireless communication, performed by a cIoT UE, may include receiving an indication that a UAC parameter has changed; and obtaining an update to the UAC parameter in connection with the indication.

In some aspects, a method of wireless communication, performed by a base station, may include transmitting an indication that a UAC parameter has changed; and transmitting an update to the UAC parameter in connection with the indication.

In some aspects, a cIoT UE for wireless communication may include memory and one or more processors operatively coupled to the memory. The memory and the one or more processors may be configured to receive an indication that a UAC parameter has changed; and obtain an update to the UAC parameter in connection with the indication.

In some aspects, a base station for wireless communication may include memory and one or more processors operatively coupled to the memory. The memory and the one or more processors may be configured to transmit an indication that a UAC parameter has changed; and transmit an update to the UAC parameter in connection with the indication.

In some aspects, a non-transitory computer-readable medium may store one or more instructions for wireless communication. The one or more instructions, when executed by one or more processors of a cIoT UE, may cause the one or more processors to: receive an indication that a UAC parameter has changed; and obtain an update to the UAC parameter in connection with the indication.

In some aspects, a non-transitory computer-readable medium may store one or more instructions for wireless communication. The one or more instructions, when executed by one or more processors of a base station, may cause the one or more processors to: transmit an indication that a UAC parameter has changed; and transmit an update to the UAC parameter in connection with the indication.

In some aspects, an apparatus for wireless communication may include means for receiving an indication that a UAC parameter has changed; and means for obtaining an update to the UAC parameter in connection with the indication.

In some aspects, an apparatus for wireless communication may include means for transmitting an indication that a UAC parameter has changed; and means for transmitting an update to the UAC parameter in connection with the indication.

Aspects generally include a method, apparatus, system, computer program product, non-transitory computer-readable medium, user equipment, cIoT user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
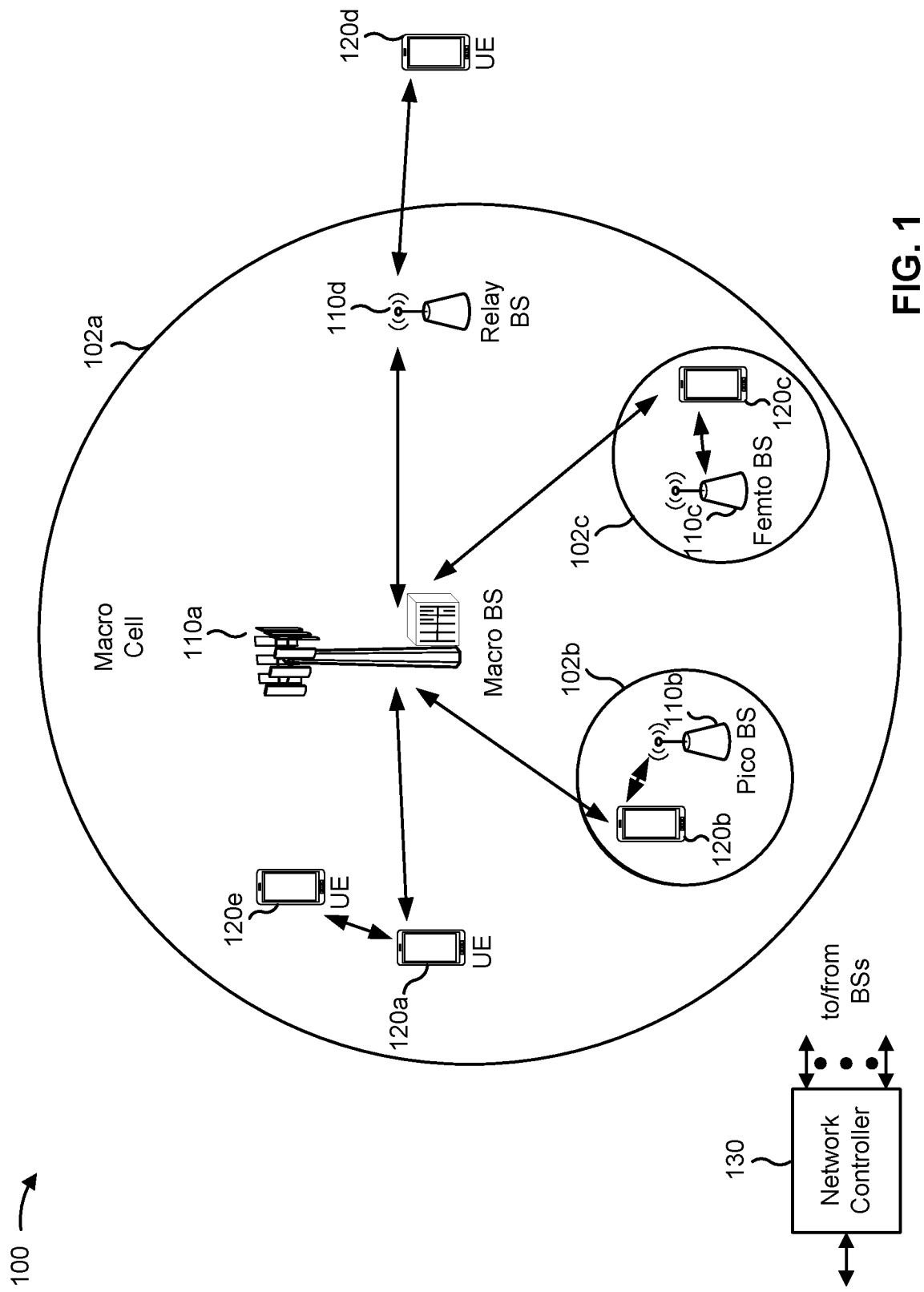
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. "MTC" may refer to MTC or eMTC. MTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. IoT UEs, eMTC UEs, coverage enhancement (CE) mode UEs, bandwidth reduced low complexity—(BL) UEs, and other types of UEs that operate using diminished power consumption relative to a baseline UE may be referred to herein as cellular IoT (cIoT) UEs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Access to the air interface may be controlled, for example, using a unified access control (UAC) system in which UEs are associated with an access identity (e.g., an access class and/or the like), which may aim to ensure that certain high-priority UEs (e.g., emergency response UEs, mission critical UEs, and/or the like) can access the air interface even in congested conditions. Updates to the UAC parameters (e.g., priority levels associated with access identities, which access identities are permitted to access the air interface, and/or the like) may be provided for cIoT UEs using a message, such as a paging message or a direct indication information, which may conserve battery power of cIoT UEs.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
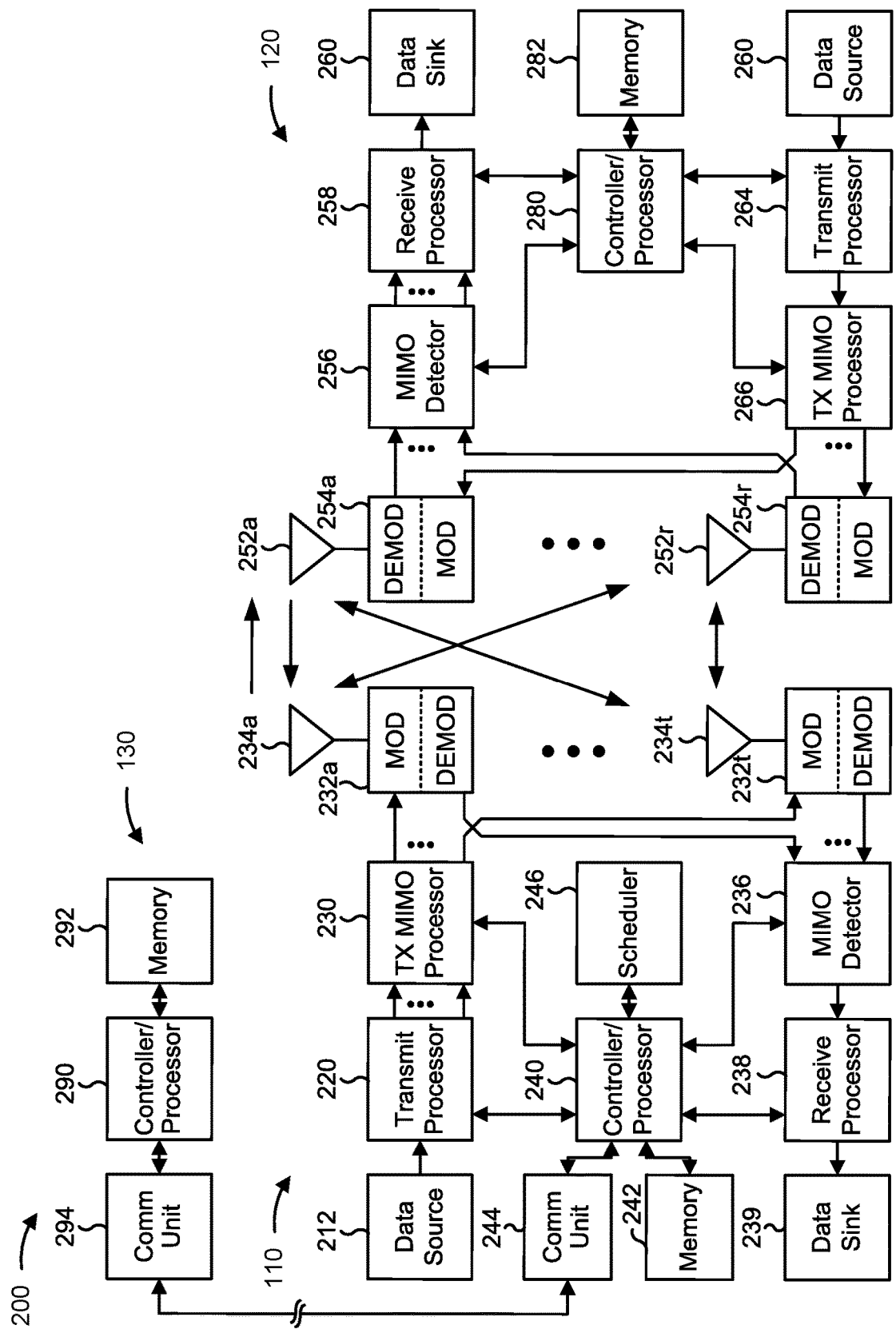
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UAC parameter updating, as described in more detail elsewhere herein. For example, controller/processor 240 of base station 110, controller/processor 280 of UE 120, and/or any other component(s) of FIG. 2 may perform or direct operations of, for example, method 400 of FIG. 4, method 500 of FIG. 5, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Figure 3:
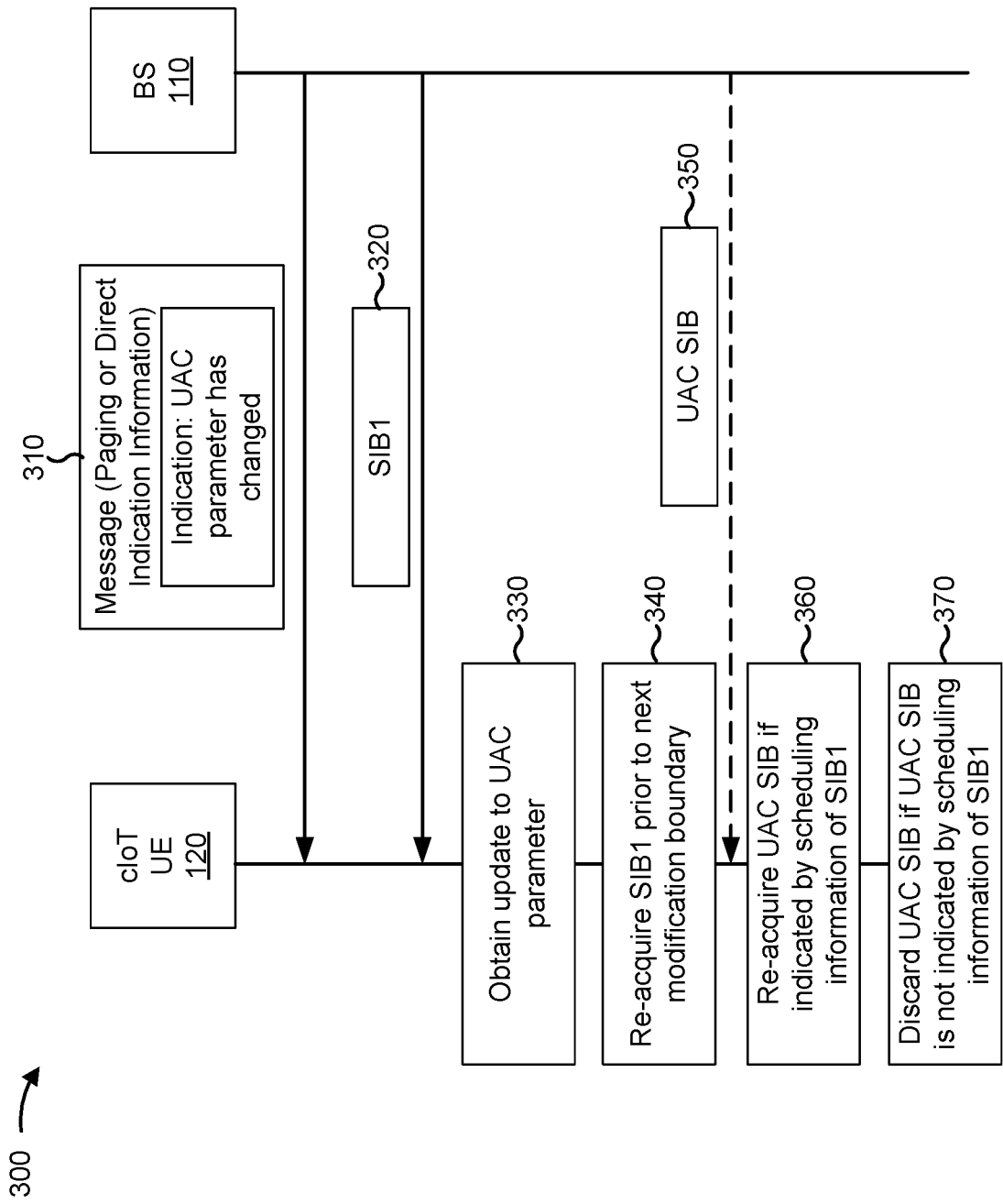
FIG. 3 is a diagram illustrating an example of messaging regarding an update to a UAC parameter.

FIG. 3 is a diagram illustrating an example 300 of messaging regarding an update to a UAC parameter. As shown, example 300 includes a cIoT UE 120 (referred to hereafter as the UE 120) and a BS 110. The techniques and apparatuses described herein can be applied for UEs other than cIoT UEs.

As shown by reference number 310, the UE 120 may receive a message including a UAC parameter update indication from the BS 110. For example, the message may include a paging message directed to the UE 120, direct indication information directed to the UE 120, and/or the like. As shown, the message may comprise an indication that a UAC parameter associated with the BS 110 has changed. For example, the UAC parameter may include access barring parameters associated with an access category, an access identity, and/or the like. "UAC parameter" may be used interchangeably with "UAC SIB parameter" herein. The indication may comprise an information element, such as an RRC information element and/or the like.

The BS 110 may transmit the indication based at least in part on changing a UAC parameter or based at least in part on the UAC parameter having changed (e.g., the UAC parameter may be changed by a 5G core network and/or the like). In some aspects, the BS 110 may change the UAC parameter at any time. For example, a system information modification period, such as a broadcast channel SIB modification period, may not restrict when the UAC parameter can be changed. In such a case, a system information value tag of SIB1 or SIB1-bandwidth reduced (SIB1-BR) may not change or may be constant when the UAC parameter is changed for CIoT devices. In some aspects, the system information value tag in SIB1 may change when a UAC parameter changes for devices meant for LTE connected to a 5G core network (5GC).

The BS 110 may transmit the indication to the UE 120 when the UE 120 is in an idle mode (e.g., an RRC idle mode), an inactive mode (e.g., an RRC inactive mode), or a connected mode (e.g., an RRC connected mode). For example, the BS 110 may transmit the indication to the UE 120 irrespective of whether the UE 120 is in the idle mode, the inactive mode, or the connected mode.

As shown by reference number 320, the BS 110 may transmit a SIB1. For example, the SIB1 may include information identifying whether a UAC SIB including the update to the UAC parameter is to be transmitted to the UE 120. The UE 120 may obtain the update to the UAC parameter using the SIB1, as described below.

As shown by reference number 330, the UE 120 may obtain an update to the UAC parameter based at least in part on the indication. For example, the UE 120 may maintain a valid UAC SIB, or may determine that UAC is not to be performed when no UAC SIB is maintained at the UE 120. Thus, when the UE 120 receives the indication that the UAC parameter has changed, the UE 120 may obtain the update to the UAC parameter indicated by the indication. An example procedure for obtaining the update is described in connection with reference numbers 340, 350, and 360.

As shown by reference number 340, the UE 120 may acquire (e.g., re-acquire, receive, decode) the SIB1 transmitted by the BS 110 prior to a next modification boundary (e.g., a boundary of a modification period of the SIB1). For example, the UE 120 may acquire the SIB1 without waiting for a next modification boundary of the SIB1. In some aspects, the UE 120 may skip monitoring of one or more instances of a scheduling information list of the SIB1 or a scheduling information list of a UAC SIB. For example, the UE 120 may not be expected to check the scheduling information list of the SIB1 unless the UE 120 has received the indication that the UAC parameter has changed. Thus, battery power and radio and processor resources of the UE 120 are conserved.

As shown by reference number 350, the BS 110 may transmit a UAC SIB. Here, the line is shown as a dashed line since the transmission of the UAC SIB may be optional (e.g., the SIB1 may indicate whether the BS 110 is to transmit the UAC SIB). The UAC SIB may identify the update to the UAC parameter, and may be in a resource As shown by reference number 360, the UE 120 may acquire (e.g., re-acquire, receive, decode) a UAC SIB if the UAC SIB is indicated by scheduling information of the SIB1. For example, if the scheduling information of the SIB1 indicates that the UAC SIB is to be transmitted, then the UE 120 may acquire the UAC SIB. The UAC SIB may include information identifying the update to the UAC parameter. Thus, the UE 120 may obtain the UAC parameter based at least in part on a direct indication or a paging message, thereby conserving battery power that would otherwise be used to periodically monitor SIB1 for an indication of an updated UAC parameter. In some aspects, if the UE 120 receives an indication that the UAC parameter has changed while the UE 120 is acquiring the UAC SIB (e.g., based at least in part on a previous indication or based at least in part on a previously-acquired SIB1), the UE 120 may continue acquiring the UAC SIB until the UE 120 re-acquires a scheduling information list in SIB1 based at least in part on the indication.

As shown by reference number 370, the UE 120 may discard a current UAC parameter if the UAC SIB is not indicated by the scheduling information of the SIB1. For example, if a scheduling information list of the SIB1 does not indicate the UAC SIB, then the UE 120 may discard a current UAC parameter. In this case, the UE 120 may determine that UAC is not to be performed, that access is not restricted, and/or the like. In some aspects, the UE 120 may attempt to access a network provided by the BS 110 or another BS using the UAC parameter (not shown in FIG. 3).

As indicated above, FIG. 3 is provided as one or more examples. Other examples may differ from what is described with respect to FIG. 3.

Figure 4:
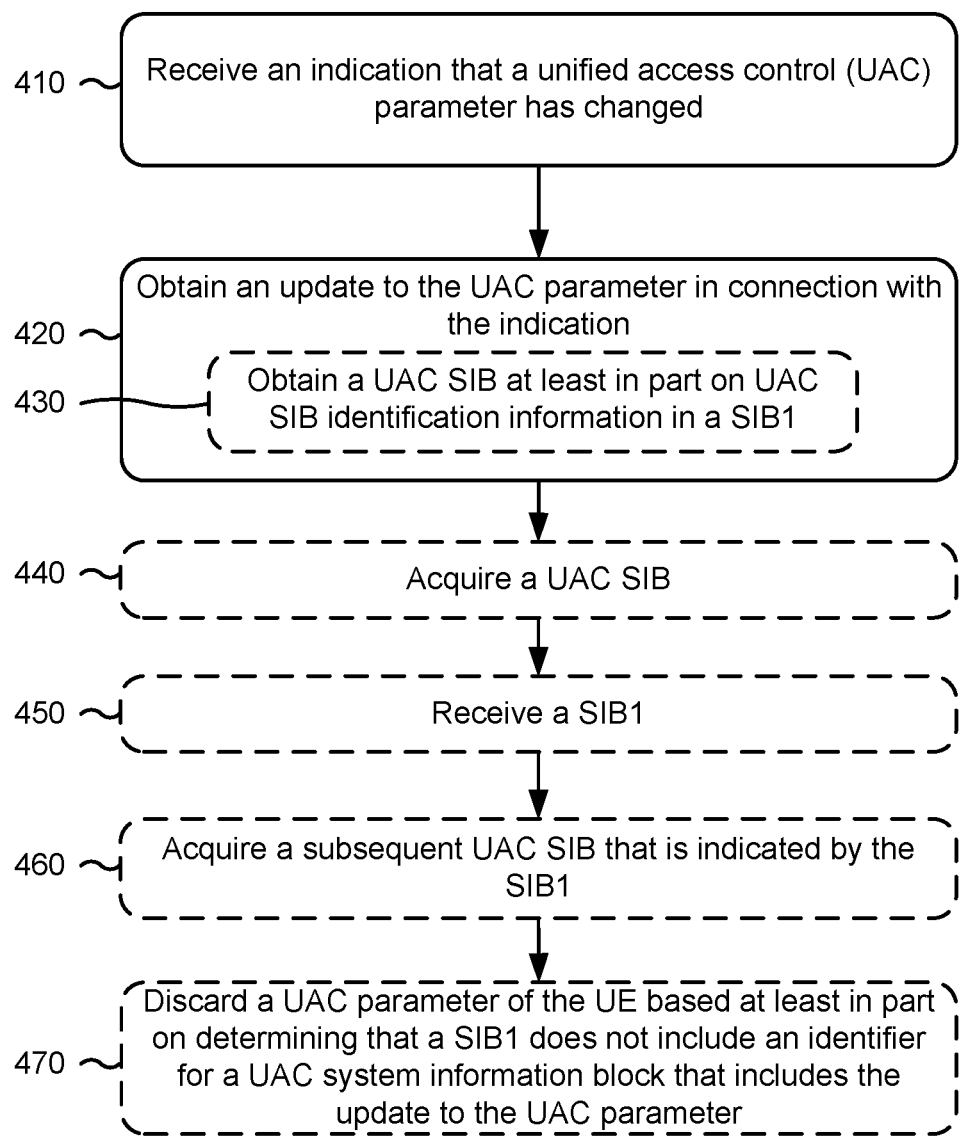
FIG. 4 is a flowchart of a method of wireless communication.

FIG. 4 is a flowchart of a method 400 of wireless communication. The method may be performed by a UE (e.g., the UE 120 of FIG. 1, the cIoT UE 120 of FIG. 3, the apparatus 602/602', and/or the like). Dashed boxes in FIG. 4 indicate optional steps.

At 410, the UE may receive (e.g., using antenna 252, DEMOD 254, MIMO detector 256, receive processor 258, controller/processor 280, and/or the like) an indication that a UAC parameter has changed. For example, in some aspects, the indication may be included in a paging message. In some aspects, the indication that the UAC parameter has changed comprises a direct indication information. In some aspects, the UE is configured to skip monitoring of one or more instances of a scheduling information list of a system information block type 1 (SIB1). In some aspects, the UE is configured to skip monitoring of one or more instances of a scheduling information list of a unified access control system information block.

At 420, the UE may obtain (e.g., using antenna 252, DEMOD 254, MIMO detector 256, receive processor 258, controller/processor 280, and/or the like) an update to the UAC parameter in connection with the indication. For example, in some aspects, the update to the UAC parameter is provided in a UAC SIB. In such a case, the UAC SIB may be obtained prior to a next system information modification period to occur. In some aspects, obtaining the update may refer to acquiring information identifying the update (e.g., a UAC SIB and/or the like), decoding information identifying the update, and/or the like.

At 430, the UE may optionally obtain (e.g., using antenna 252, DEMOD 254, MIMO detector 256, receive processor 258, controller/processor 280, and/or the like) a UAC SIB based at least in part on UAC SIB identification information (e.g., a scheduling information list and/or the like) in a SIB1. For example, obtaining the update to the UAC parameter may further comprise obtaining the UAC SIB at least in part on the UAC SIB identification information in the SIB1.

Blocks 440 through 460 show a procedure for when the UE (e.g., using antenna 252, DEMOD 254, MIMO detector 256, receive processor 258, controller/processor 280, and/or the like) receives the indication that the UAC parameter has changed while acquiring a UAC SIB. At 440, the UE may acquire a UAC SIB. For example, the UE may acquire or obtain the UAC SIB that the UE was in the process of acquiring when the indication is received. At 450, the UE may receive a SIB1. For example, the UE may acquire or obtain the SIB1 based at least in part on the indication and to identify a subsequent UAC SIB based at least in part on information included in the SIB1. At 460, the UE may acquire a subsequent UAC SIB that is indicated by the SIB1. For example, the UE may acquire the subsequent UAC SIB in accordance with information, included in the SIB1, indicating that the UAC SIB is to be received.

At 470, the UE may (e.g., using antenna 252, DEMOD 254, MIMO detector 256, receive processor 258, controller/processor 280, and/or the like) discard a UAC parameter of the UE based at least in part on determining that a SIB1 does not include an identifier (e.g., an entry of a scheduling information list and/or the like) for a UAC SIB that includes the update to the UAC parameter. For example, when the SIB1 does not indicate a UAC SIB, then the UE may discard the UAC parameter of the UE.

Method 400 may include any single aspect or any combination of aspects described below and/or in connection with one or more other processes described elsewhere herein.

In a first aspect, the indication is included in a paging message.

In a second aspect, alone or in combination with the first aspect, when the indication is received while the UE is acquiring a UAC SIB, obtaining the update to the UAC parameter further comprises acquiring the UAC SIB, receiving a SIB1, and acquiring a subsequent UAC SIB that is indicated by the SIB1.

In a third aspect, alone or in combination with any one or more of the first and second aspects, the indication that the UAC parameter has changed comprises a direct indication information.

In a fourth aspect, alone or in combination with any one or more of the first through third aspects, the update to the UAC parameter is provided in a UAC SIB.

In a fifth aspect, alone or in combination with any one or more of the first through fourth aspects, the UAC SIB is obtained prior to a next system information modification period to occur.

In a sixth aspect, alone or in combination with any one or more of the first through fifth aspects, obtaining the update to the UAC parameter further comprises obtaining the UAC SIB at least in part on the UAC SIB identification information in the SIB1.

In a seventh aspect, alone or in combination with any one or more of the first through sixth aspects, the UE is configured to skip monitoring of one or more instances of a scheduling information list of a system information block type 1.

In an eighth aspect, alone or in combination with any one or more of the first through seventh aspects, the UE is configured to skip monitoring of one or more instances of a scheduling information list of a unified access control system information block.

In a ninth aspect, alone or in combination with any one or more of the first through eighth aspects, obtaining the update to the UAC parameter in connection with the indication further comprises discarding a UAC parameter of the UE based at least in part on determining that a SIB1 does not include an identifier for a UAC system information block that includes the update to the UAC parameter.

Although FIG. 4 shows example blocks of a method of wireless communication, in some aspects, the method may include additional blocks, fewer blocks, different blocks, or differently arranged blocks than those shown in FIG. 4. Additionally, or alternatively, two or more blocks shown in FIG. 4 may be performed in parallel.

Figure 5:
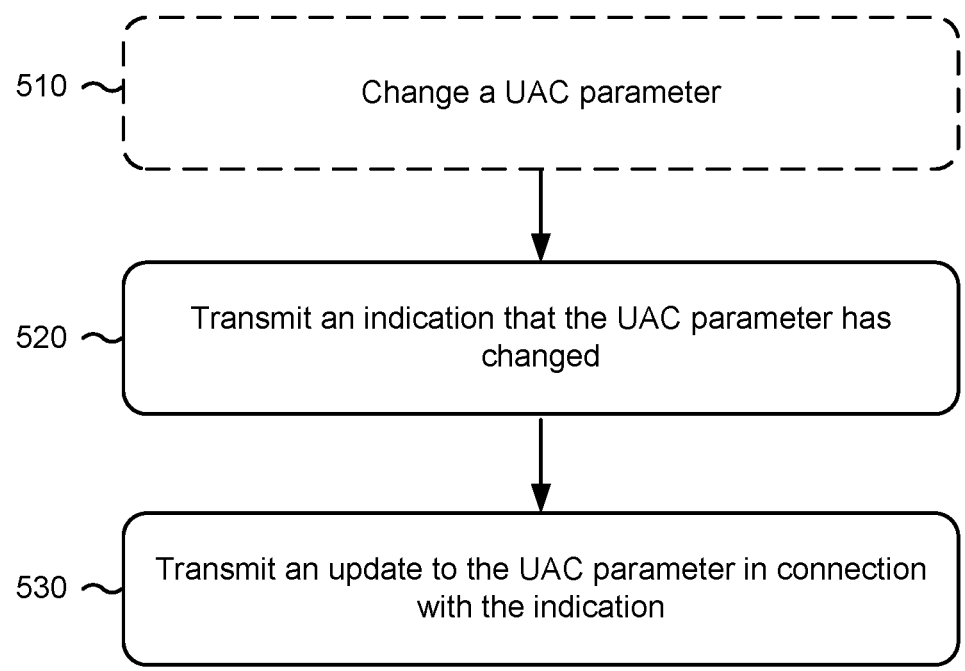
FIG. 5 is a flowchart of a method of wireless communication.

FIG. 5 is a flowchart of a method 500 of wireless communication. The method may be performed by a base station (e.g., the BS 110 of FIG. 1, the apparatus 802/802', and/or the like). Dashed boxes in FIG. 5 indicate optional steps.

At 510, the base station (e.g., using controller/processor 240 and/or the like) may change a UAC parameter. For example, the base station may change one or more UAC parameters (e.g., based at least in part on an indication from a core network, based at least in part on a determination by the base station, and/or the like).

At 520, the base station (e.g., using controller/processor 240, transmit processor 220, TX MIMO processor 230, MOD 232, antenna 234, and/or the like) may transmit an indication that the UAC parameter has changed. For example, in some aspects, the indication may be included in a paging message. In some aspects, the indication that the UAC parameter has changed comprises a direct indication information.

At 530, the base station (e.g., using controller/processor 240, transmit processor 220, TX MIMO processor 230, MOD 232, antenna 234, and/or the like) may transmit an update to the UAC parameter in connection with the indication. In some aspects, the update to the access control parameter is provided in a UAC SIB.

Method 500 may include any single aspect or any combination of aspects described below and/or in connection with one or more other processes described elsewhere herein.

In a first aspect, the indication is included in a paging message.

In a second aspect, alone or in combination with the first aspect, when the indication is transmitted while the UE is acquiring a UAC SIB, the method further comprises transmitting the UAC SIB, transmitting a SIB1, and transmitting a subsequent UAC SIB that is indicated by the SIB1.

In a third aspect, alone or in combination with any one or more of the first and second aspects, the indication that the UAC parameter has changed comprises a direct indication information.

In a fourth aspect, alone or in combination with any one or more of the first through third aspects, the update to the UAC parameter is provided in a UAC SIB.

In a fifth aspect, alone or in combination with any one or more of the first through fourth aspects, the UAC SIB is transmitted prior to a next system information modification period to occur.

In a sixth aspect, alone or in combination with any one or more of the first through fifth aspects, transmitting the update to the UAC parameter further comprises transmitting the UAC SIB at least in part on the UAC SIB identification information in the SIB1.

Although FIG. 5 shows example blocks of a method of wireless communication, in some aspects, the method may include additional blocks, fewer blocks, different blocks, or differently arranged blocks than those shown in FIG. 5. Additionally, or alternatively, two or more blocks shown in FIG. 5 may be performed in parallel.

Figure 6:
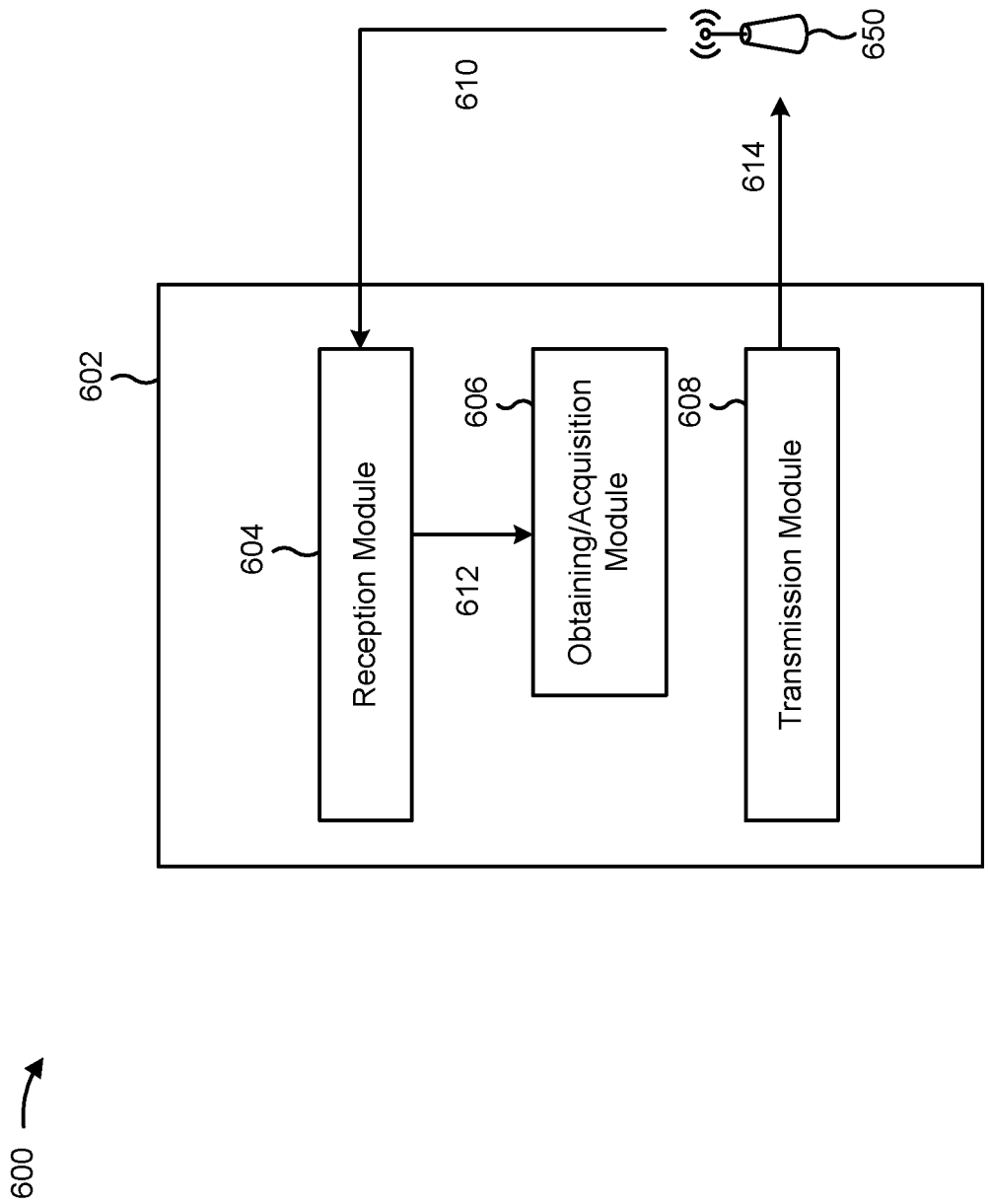
FIG. 6 is a conceptual data flow diagram illustrating the data flow between different modules/means/components in an example apparatus.

FIG. 6 is a conceptual data flow diagram 600 illustrating the data flow between different modules/means/components in an example apparatus 602. The apparatus 602 may be a UE such as the UE 120. In some aspects, the apparatus 602 includes a reception module 604, an obtaining/acquisition module 606, and/or a transmission module 608.

The reception module 604 may receive signals 610 from a BS 650 (e.g., the BS 110 and/or the like). For example, the signals 610 may include an indication that a unified access control (UAC) parameter has changed, an update to the UAC parameter in connection with the indication, a UAC SIB, a SIB1, a subsequent UAC SIB, direct indication information, a paging message, and/or the like. The reception module 604 may provide data 612 to the obtaining/acquisition module 606. The obtaining/acquisition module 606 may obtain or acquire an update to a UAC parameter, a SIB1, a UAC SIB, and/or the like based at least in part on the data 612. In some aspects, the obtaining/acquisition module may discard a UAC parameter of the UE based at least in part on determining that a SIB1, obtained by the obtaining/acquisition module 606, does not include an identifier for a UAC SIB that includes an update to the UAC parameter. The transmission module 608 may transmit data 614 to the BS 650.

The apparatus may include additional modules that perform each of the blocks of the algorithm in the aforementioned method 400 of FIG. 4, and/or the like. Each block in the aforementioned method 400 of FIG. 4 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 6 are provided as an example. In practice, there may be additional modules, fewer modules, different modules, or differently arranged modules than those shown in FIG. 6. Furthermore, two or more modules shown in FIG. 6 may be implemented within a single module, or a single module shown in FIG. 6 may be implemented as multiple, distributed modules. Additionally, or alternatively, a set of modules (e.g., one or more modules) shown in FIG. 6 may perform one or more functions described as being performed by another set of modules shown in FIG. 6.

Figure 7:
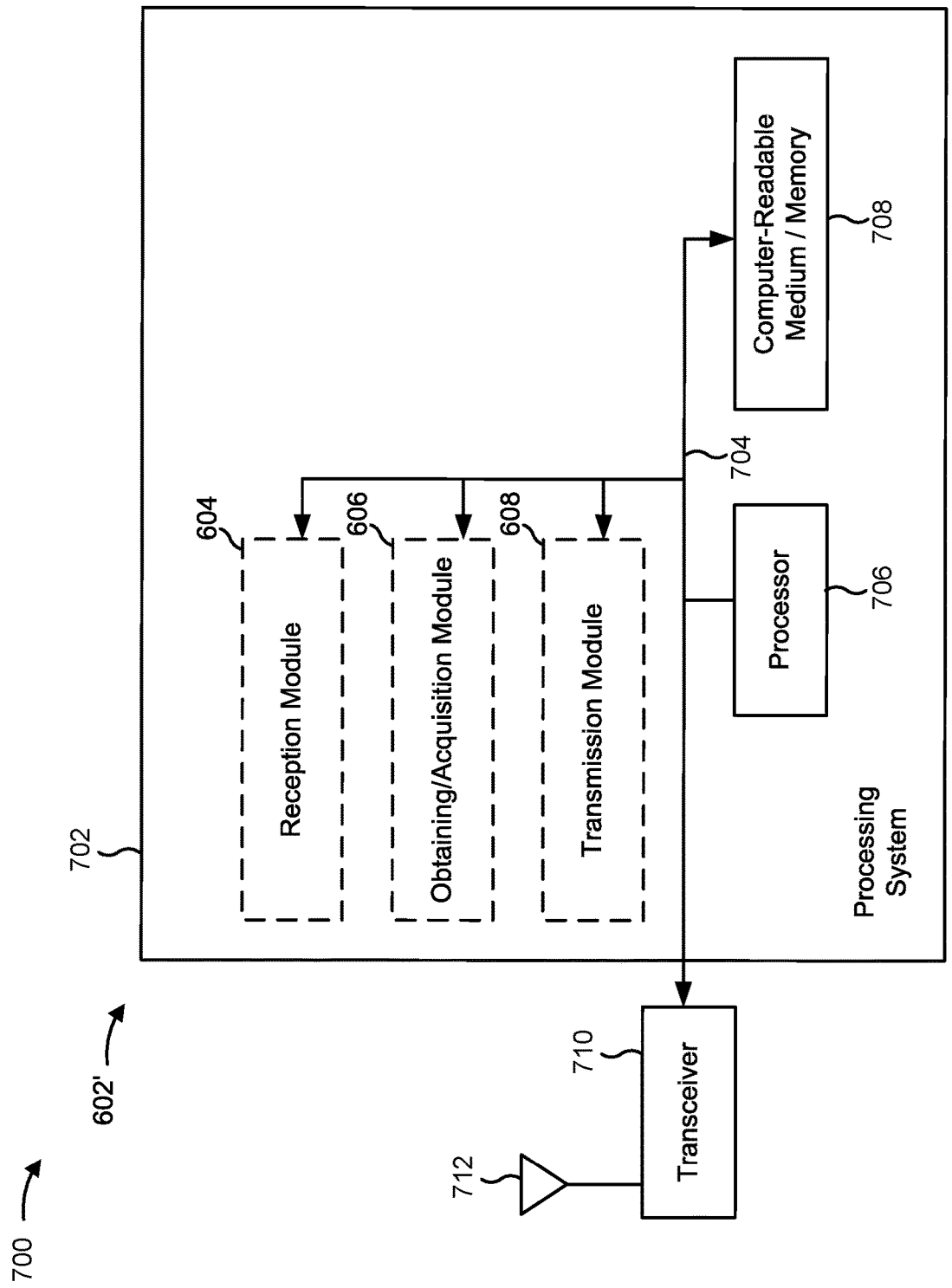
FIG. 7 is a diagram illustrating an example of a hardware implementation for an apparatus employing a processing system.

FIG. 7 is a diagram 700 illustrating an example of a hardware implementation for an apparatus 602' employing a processing system 702. The apparatus 602' may be a UE.

The processing system 702 may be implemented with a bus architecture, represented generally by the bus 704. The bus 704 may include any number of interconnecting buses and bridges depending on the specific application of the processing system 702 and the overall design constraints. The bus 704 links together various circuits including one or more processors and/or hardware modules, represented by the processor 706, the modules 604, 606, 608, and the computer-readable medium/memory 708. The bus 704 may also link various other circuits such as timing sources, peripherals, voltage regulators, and power management circuits, which are well known in the art, and therefore will not be described any further.

The processing system 702 may be coupled to a transceiver 710. The transceiver 710 is coupled to one or more antennas 712. The transceiver 710 provides a means for communicating with various other apparatuses over a transmission medium. The transceiver 710 receives a signal from the one or more antennas 712, extracts information from the received signal, and provides the extracted information to the processing system 702, specifically the reception module 604. In addition, the transceiver 710 receives information from the processing system 702, specifically the transmission module 608, and based at least in part on the received information, generates a signal to be applied to the one or more antennas 712. The processing system 702 includes a processor 706 coupled to a computer-readable medium/memory 708. The processor 706 is responsible for general processing, including the execution of software stored on the computer-readable medium/memory 708. The software, when executed by the processor 706, causes the processing system 702 to perform the various functions described herein for any particular apparatus. The computer-readable medium/memory 708 may also be used for storing data that is manipulated by the processor 706 when executing software. The processing system further includes at least one of the modules 604, 606, and 608. The modules may be software modules running in the processor 706, resident/stored in the computer readable medium/memory 708, one or more hardware modules coupled to the processor 706, or some combination thereof. The processing system 702 may be a component of the UE 120 and may include the memory 282 and/or at least one of the TX MIMO processor 266, the RX processor 258, and/or the controller/processor 280.

In some aspects, the apparatus 602/602' for wireless communication includes means for receiving an indication that a UAC parameter has changed; means for obtaining an update to the UAC parameter in connection with the indication; means for acquiring the UAC SIB; means for receiving a system information block type 1 (SIB1); means for acquiring a subsequent UAC SIB that is indicated by the SIB1; means for obtaining the UAC SIB at least in part on the UAC SIB identification information in the SIB1; and means for discarding a UAC parameter of the UE based at least in part on determining that a SIB1 does not include an identifier for a UAC system information block that includes the update to the UAC parameter. The aforementioned means may be one or more of the aforementioned modules of the apparatus 602 and/or the processing system 702 of the apparatus 602' configured to perform the functions recited by the aforementioned means. As described elsewhere herein, the processing system 702 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 7 is provided as an example. Other examples may differ from what is described in connection with FIG. 7.

Figure 8:
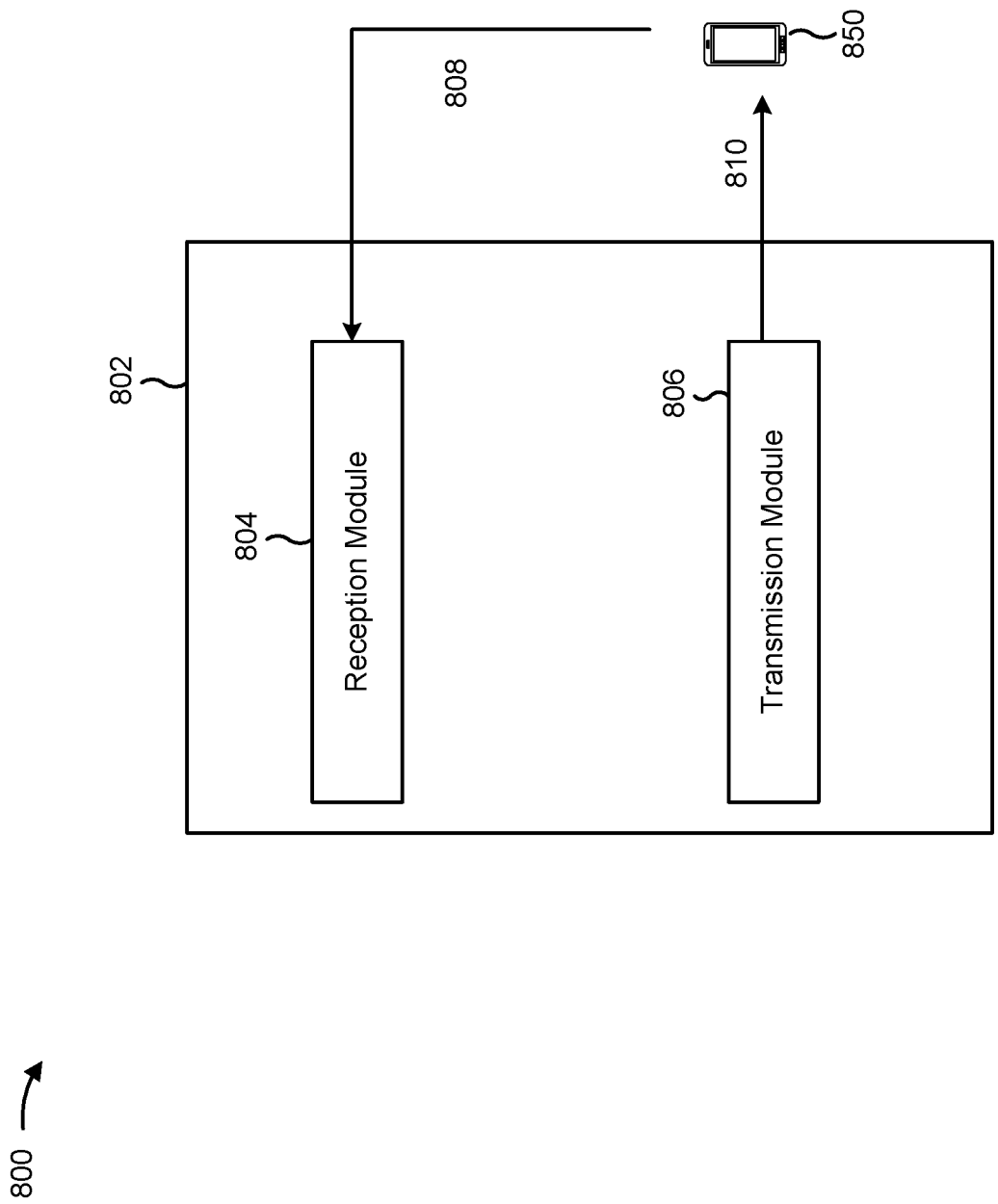
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a BS such as the BS 110. In some aspects, the apparatus 802 includes a reception module 804 and/or a transmission module 806. The reception module 804 may receive signals 808 from the UE 850 (e.g., UE 120) and is not described any further. The transmission module 806 may transmit signals 810 to the UE 850. The signals 810 may include an indication that a UAC parameter has changed, a UAC SIB, a SIB1, a paging message, direct indication information, an update to the UAC parameter, and/or the like.

The apparatus may include additional modules that perform each of the blocks of the algorithm in the aforementioned method 500 of FIG. 5, and/or the like. Each block in the aforementioned method 500 of FIG. 5 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
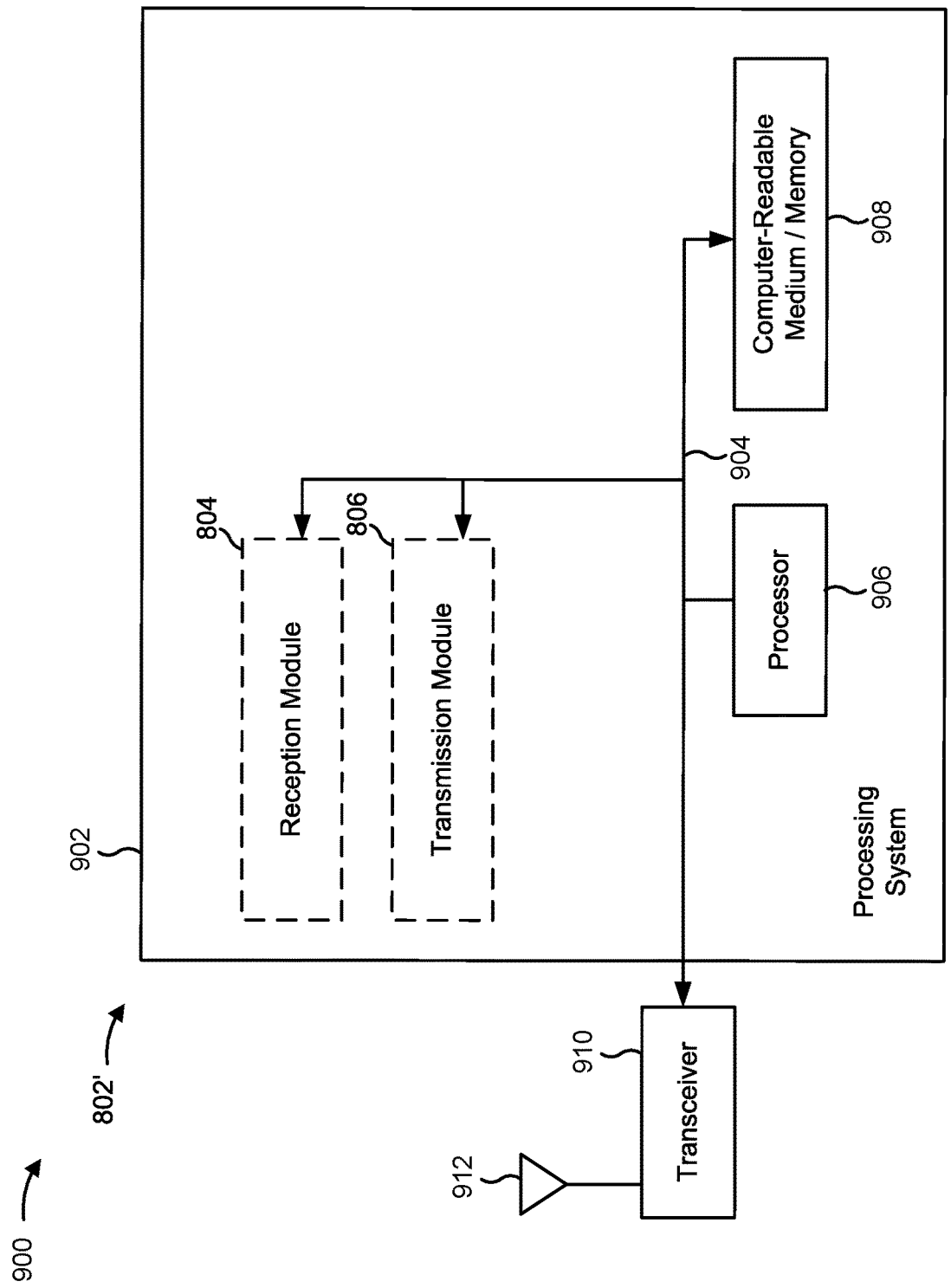
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a BS.

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, and the computer-readable medium/memory 908. The bus 904 may also link various other circuits such as timing sources, peripherals, voltage regulators, and power management circuits, which are well known in the art, and therefore will not be described any further.

The processing system 902 may be coupled to a transceiver 910. The transceiver 910 is coupled to one or more antennas 912. The transceiver 910 provides a means for communicating with various other apparatuses over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 806, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described herein for any particular apparatus. The computer-readable medium/memory 908 may also be used for storing data that is manipulated by the processor 906 when executing software. The processing system further includes at least one of the modules 804 and 806. The modules may be software modules running in the processor 906, resident/stored in the computer readable medium/memory 908, one or more hardware modules coupled to the processor 906, or some combination thereof. The processing system 902 may be a component of the eNB 110 and may include the memory 242 and/or at least one of the TX MIMO processor 230, the RX processor 238, and/or the controller/processor 240.

In some aspects, the apparatus 802/802' for wireless communication includes means for transmitting an indication that a UAC parameter has changed; means for transmitting an update to the UAC parameter in connection with the indication; means for transmitting the UAC SIB; means for transmitting a SIB1; and means for transmitting a subsequent UAC SIB that is indicated by the SIB1. The aforementioned means may be one or more of the aforementioned modules of the apparatus 802 and/or the processing system 902 of the apparatus 802' configured to perform the functions recited by the aforementioned means. As described elsewhere herein, the processing system 902 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 9 is provided as an example. Other examples may differ from what is described in connection with FIG. 9.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a cellular Internet of Things (cIoT) user equipment (UE), comprising:
    receiving a first indication that a unified access control (UAC) parameter has changed;
    receiving a system information block type 1 (SIB1) based at least in part on receiving the first indication;
    receiving a second indication, that the UAC parameter has changed, while acquiring a UAC system information block (SIB),
        wherein the UAC SIB includes an update to the UAC parameter; and
    re-acquiring a scheduling information list in the SIB1 based at least in part on receiving the second indication while acquiring the UAC SIB.

2. The method of claim 1, wherein the first indication that the UAC parameter has changed is included in a paging message.

3. The method of claim 1, further comprising:
    continuing to acquire, based at least in part on receiving the second indication while acquiring the UAC SIB, the UAC SIB until the cIoT UE re-acquires the scheduling information list.

4. The method of claim 1, wherein the first indication that the UAC parameter has changed comprises direct indication information.

5. The method of claim 1, wherein the UAC SIB is acquired prior to a next system information modification period to occur.

6. The method of claim 1, wherein acquiring the UAC SIB comprises:
    acquiring the UAC SIB based at least in part on the scheduling information list.

7. The method of claim 1, wherein the cIoT UE is configured to skip monitoring of one or more instances of the scheduling information list.

8. The method of claim 1, wherein the cIoT UE is configured to skip monitoring of one or more instances of a scheduling information list of the UAC SIB.

9. The method of claim 1, further comprising:
    discarding a current UAC parameter of the cIoT UE based at least in part on determining that the SIB1 does not include an identifier for the UAC SIB that includes the update to the UAC parameter.

10. A method of wireless communication performed by a network entity, comprising:
    transmitting a first indication that a unified access control (UAC) parameter has changed;
    transmitting a system information block type 1 (SIB1) based at least in part on receiving the first indication;
    transmitting a second indication, that the UAC parameter has changed, while transmitting a UAC system information block (SIB),
        wherein the UAC SIB includes an update to the UAC parameter; and
    re-transmitting a scheduling information list in the SIB1 based at least in part on transmitting the second indication while transmitting the UAC SIB.

11. The method of claim 10, wherein the first indication is included in a paging message.

12. The method of claim 10, wherein the first indication that the UAC parameter has changed comprises direct indication information.

13. The method of claim 10, wherein the UAC SIB is transmitted prior to a next system information modification period to occur.

14. The method of claim 10, further comprising:
    transmitting a subsequent UAC SIB that is indicated by the SIB1.

15. A cellular Internet of Things (cIoT) user equipment (UE) for wireless communication, comprising:
    a memory; and
    one or more processors coupled to the memory, the one or more processors configured to:
        receive a first indication that a unified access control (UAC) parameter has changed;
        receive a system information block type 1 (SIB1) based at least in part on receiving the first indication;
        receive a second indication, that the UAC parameter has changed, while acquiring a UAC system information block (SIB),
            wherein the UAC SIB includes an update to the UAC parameter; and
        re-acquire a scheduling information list in the SIB1 based at least in part on receiving the second indication while acquiring the UAC SIB.

16. The cIoT UE of claim 15, wherein the first indication is included in a paging message.

17. The cIoT UE of claim 15, wherein the one or more processors are further configured to:

continue to acquire, based at least in part on receiving the second indication while acquiring the UAC SIB, the UAC SIB until the cIoT UE re-acquires the scheduling information list.

18. The cIoT UE of claim 15, wherein the first indication that the UAC parameter has changed comprises direct indication information.

19. The cIoT UE of claim 15, wherein the one or more processors, to acquire the UAC SIB, are configured to:
acquire the UAC SIB based at least in part on the scheduling information list.

20. The cIoT UE of claim 15, wherein the UAC SIB is acquired prior to a next system information modification period to occur.

21. The cIoT UE of claim 15, wherein the cIoT UE is configured to skip monitoring of one or more instances of the scheduling information list.

22. The cIoT UE of claim 15, wherein the cIoT UE is configured to skip monitoring of one or more instances of a scheduling information list of the UAC SIB.

23. The cIoT UE of claim 15, wherein the one or more processors are further configured to:
discard a current UAC parameter of the cIoT UE based at least in part on determining that the SIB1 does not include an identifier for the UAC SIB that includes the update to the UAC parameter.

24. A network entity for wireless communication, comprising:
a memory; and
one or more processors coupled to the memory, the one or more processors configured to:
transmit a first indication that a unified access control (UAC) parameter has changed;
transmit a system information block type 1 (SIB1) based at least in part on receiving the first indication;
transmit a second indication, that the UAC parameter has changed, while transmitting a UAC system information block (SIB),
wherein the UAC SIB includes an update to the UAC parameter; and
re-transmit a scheduling information list in the SIB1 based at least in part on transmitting the second indication while transmitting the UAC SIB.

25. The network entity of claim 24, wherein the first indication is included in a paging message.

26. The network entity of claim 24, wherein the first indication that the UAC parameter has changed comprises direct indication information.

27. The network entity of claim 24, wherein the UAC SIB is transmitted prior to a next system information modification period to occur.

28. The network entity of claim 24, wherein the one or more processors are further configured to:
transmit a subsequent UAC SIB that is indicated by the SIB1.

29. An apparatus for wireless communication, comprising:
means for receiving a first indication that a unified access control (UAC) parameter has changed;
means for receiving a system information block type 1 (SIB1) based at least in part on receiving the first indication;
means for receiving a second indication, that the UAC parameter has changed, while acquiring a UAC system information block (SIB),
wherein the UAC SIB includes an update to the UAC parameter; and
means for re-acquiring a scheduling information list in the SIB1 based at least in part on receiving the second indication while acquiring the UAC SIB.

30. The apparatus of claim 29, wherein the first indication is provided in a paging message.

31. The apparatus of claim 29, further comprising:
means for continuing to acquire, based at least in part on receiving the second indication while acquiring the UAC SIB, the UAC SIB until the re-acquires the scheduling information list.

32. The apparatus of claim 29, wherein the first indication that the UAC parameter has changed comprises direct indication information.

33. The apparatus of claim 29, wherein the UAC SIB is acquired prior to a next system information modification period to occur.

34. The apparatus of claim 29, wherein the means for receiving the second indication while acquiring the UAC SIB comprises:
means for acquiring the UAC SIB based at least in part on the scheduling information list.

35. The apparatus of claim 29, further comprising:
means for skipping monitoring of one or more instances of the scheduling information list.

36. The apparatus of claim 29, further comprising:
means for skipping monitoring of one or more instances of a scheduling information list of the UAC SIB.

37. The apparatus of claim 29, further comprising:
means for discarding a current UAC parameter of the apparatus based at least in part on determining that the SIB1 does not include an identifier for the UAC SIB that includes the update to the UAC parameter.

38. An apparatus for wireless communication, comprising:
means for transmitting a first indication that a unified access control (UAC) parameter has changed;
means for transmitting a system information block type 1 (SIB1) based at least in part on receiving the first indication;
means for transmitting a second indication, that the UAC parameter has changed, while transmitting a UAC system information block (SIB),
wherein the UAC SIB includes an update to the UAC parameter; and
means for re-transmitting a scheduling information list in the SIB1 based at least in part on transmitting the second indication while transmitting the UAC SIB.

39. The apparatus of claim 38, wherein the first indication is included in a paging message.

40. The apparatus of claim 38, wherein the first indication that the UAC parameter has changed comprises direct indication information.

41. The apparatus of claim 38, wherein the UAC SIB is transmitted prior to a next system information modification period to occur.

42. The apparatus of claim 38, further comprising:
means for transmitting a subsequent UAC SIB that is indicated by the SIB1.

43. The method of claim 1, wherein the first indication is received while the cIoT UE is in an idle mode or an inactive mode.

44. The method of claim 10, wherein transmitting the first indication comprises:
transmitting the first indication to a user equipment that is an idle mode or an inactive mode.

45. The cIoT UE of claim 15, wherein the first indication is received while the cIoT UE is in an idle mode or an inactive mode.

46. The network entity of claim 24, wherein the one or more processors, to transmit the first indication, are configured to:
   transmit the first indication to a user equipment that is in an idle mode or an inactive mode.

47. The apparatus of claim 29, wherein the first indication is received while the apparatus is in an idle mode or an inactive mode.

48. The cIoT UE of claim 15, wherein the one or more processors, to receive the second indication while acquiring the UAC SIB, are configured to:
   receive the second indication while obtaining the UAC SIB based on a previous indication.

\* \* \* \* \*